(12) United States Patent
Zhou et al.

(10) Patent No.: US 11,675,254 B2
(45) Date of Patent: Jun. 13, 2023

(54) QUICK-ASSEMBLY COMPONENT AND PHOTOGRAPHING APPARATUS

(71) Applicant: Shenzhen youzhisheng Technology Co., Ltd., Shenzhen (CN)

(72) Inventors: Shengwu Zhou, Shenzhen (CN); Weixin Jiang, Shenzhen (CN); Hanjun Luo, Shenzhen (CN); Hailin Zhang, Shenzhen (CN); Chunguang Zheng, Shenzhen (CN)

(73) Assignee: Shenzhen youzhisheng Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/894,186

(22) Filed: Aug. 24, 2022

(65) Prior Publication Data

US 2022/0404688 A1   Dec. 22, 2022

Related U.S. Application Data

(63) Continuation-in-part of application No. 17/571,551, filed on Jan. 10, 2022.

(30) Foreign Application Priority Data

Jan. 14, 2021 (CN) .......................... 202120095718.9
Aug. 24, 2021 (CN) .......................... 202110976922.6

(51) Int. Cl.
*G03B 17/56* (2021.01)
*F16M 11/04* (2006.01)
*H04N 23/51* (2023.01)

(52) U.S. Cl.
CPC ......... *G03B 17/561* (2013.01); *F16M 11/041* (2013.01); *H04N 23/51* (2023.01)

(58) Field of Classification Search
CPC ..... H04M 1/04; H04B 1/3888; G03B 17/561; F16M 11/041
See application file for complete search history.

(56) References Cited

U.S. PATENT DOCUMENTS

| | | | |
|---|---|---|---|
| 8,627,953 B1* | 1/2014 | Yeo ...................... | H05K 5/0221 206/320 |
| 9,651,069 B2* | 5/2017 | Aspinall ................... | F16B 2/04 |
| 9,869,423 B2* | 1/2018 | Khodapanah ...... | F16M 11/2021 |
| 9,975,497 B2* | 5/2018 | Kim ...................... | F16M 11/041 |

(Continued)

*Primary Examiner* — Leon W Rhodes, Jr.
(74) *Attorney, Agent, or Firm* — Bayramoglu Law Offices LLC (57) ABSTRACT

A quick-assembly component includes a quickly-assembly plate and a quick-assembly seat. The quick-assembly plate has a first surface and a second surface oppositely arranged along a thickness direction of the quick-assembly plate. The first surface is provided with a recess; a side wall of the recess is provided with a clamping slot communicating with the recess. The quick-assembly seat includes a seat body, a touch assembly, and clamping assemblies. The touch assembly includes touch members that are movable relative to the seat body along the thickness direction of the quick-assembly plate. The clamping assemblies each include a clamping member and a first restoring member provided between the clamping member and the seat body. The clamping member is movable relative to the seat body to allow the first restoring member to accumulate and release a restoring force.

17 Claims, 8 Drawing Sheets

(56) References Cited

U.S. PATENT DOCUMENTS

| | | | |
|---|---|---|---|
| 10,491,727 B1* | 11/2019 | Liu | H04M 1/04 |
| 10,598,199 B1* | 3/2020 | Fan | F16M 13/022 |
| 10,948,001 B2* | 3/2021 | Yang | F16B 2/12 |
| 2019/0055976 A1* | 2/2019 | Repka | F16B 21/09 |
| 2021/0046885 A1* | 2/2021 | Jankura | F16M 13/02 |
| 2021/0270408 A1* | 9/2021 | Trudnak | F16B 2/22 |

* cited by examiner

QUICK-ASSEMBLY COMPONENT AND PHOTOGRAPHING APPARATUS

CROSS REFERENCE TO THE RELATED APPLICATIONS

This application is a continuation-in-part application of the U.S. application Ser. No. 17/571,551, filed on Jan. 10, 2022, which claims priority to Chinese Patent Application No. 202110976922.6, filed on Aug. 24, 2021, and Chinese Patent Application No. 202120095718.9, filed on Jan. 14, 2021.

TECHNICAL FIELD

The present disclosure relates to the technical field of photographic accessories and, in particular, to a quick-assembly component and a photographing apparatus.

BACKGROUND

With the improvement of people's living standards, photographing devices are becoming more widely used in people's daily life. Photographing devices, such as mobile phones and cameras, are used for photography. In order to make facilitate photography, before photographing, the photographing device is usually mounted on a support to free up the photographer's hands and fix the photographing position of the photographing device, thereby achieving better photographing effects. To facilitate the disassembly and assembly of the photographing device on the support, a quick-assembly component is typically used to fix the photographing device to the support. The quick-assembly component has two quick-assembly seats for quick-assembly fitting, and the two quick-assembly seats are respectively connected to the support and the photographing device to realize quick assembly and disassembly of the photographing device on the support. However, the overall thickness of the conventional quick-assembly component is too large after the two quick-assembly seats are fitted with each other.

SUMMARY

The present disclosure provides a quick-assembly component and a photographing apparatus to solve the technical problem that the overall thickness of the conventional quick-assembly component is too large after two quick-assembly seats are fitted with each other.

The present disclosure adopts the following technical solutions to solve the above technical problem.

A first aspect of the present disclosure provides a quick-assembly component including a quick-assembly plate and a quick-assembly seat.

The quick-assembly plate is provided with a first surface and a second surface oppositely arranged along a thickness direction of the quick-assembly plate. The first surface is provided with a recess, and a side wall of the recess is provided with a clamping slot communicating with the recess.

The quick-assembly seat includes a seat body, a touch assembly, and clamping assemblies. The touch assembly includes touch members that are movable relative to the seat body along the thickness direction of the quick-assembly plate. The clamping assemblies each include a clamping member and a first restoring member provided between the clamping member and the seat body, and the clamping member is movable relative to the seat body to allow the first restoring member to accumulate and release a restoring force.

The clamping member can be clamped with the touch member to allow the first restoring member to accumulate the restoring force. When the quick-assembly plate and the quick-assembly seat are brought close to each other, the touch member presses against the first surface and moves relative to the seat body along the thickness direction of the quick-assembly plate; thus, the clamping member becomes separated from the touch member and the first restoring member releases the restoring force to drive the clamping member into the clamping slot.

A second aspect of the present disclosure provides a photographing apparatus. The photographing apparatus includes a photographing device and the above quick-assembly component, and the photographing device is connected to the quick-assembly plate or the quick-assembly seat.

According to the above technical solutions, the embodiments of the present disclosure have at least the following beneficial effects.

In the quick-assembly component and the photographing apparatus of the embodiments of the present disclosure, one of the quick-assembly plate and the quick-assembly seat is connected to the photographing device, and the other is connected to the support. In this way, the photographing device is fixedly mounted on the support through the fitting between the quick-assembly plate and the quick-assembly seat. Specifically, the quick-assembly plate and the quick-assembly seat are brought close to each other. The touch member presses against the first surface and moves relative to the seat body along the thickness direction of the quick-assembly plate, such that the clamping member is separated from the touch member. After being separated from the touch member, the clamping member enters the clamping slot under the restoring force released by the first restoring member to realize the quick-assembly fitting of the quick-assembly plate and the quick-assembly seat. Based on the configuration of the touch member, the quick-assembly fitting of the quick-assembly plate and the quick-assembly seat can be realized by simply bringing the quick-assembly plate and the quick-assembly seat close to each other and pressing the touch member, which simplifies the quick-assembly operation steps. In addition, since the touch member presses against the first surface instead of protruding into the recess and pressing against the bottom wall of the recess, the bottom wall of the recess of the quick-assembly plate can be omitted. That is, the recess can penetrate through the first surface and the second surface, and the recess without the bottom wall can make the quick-assembly plate thinner and reduce the thickness of the quick-assembly plate. Alternatively, the bottom wall of the recess may be thinner. In the conventional solution, the bottom wall of the recess presses against the touch member, and the bottom wall of the recess must have a certain thickness to avoid being punctured. In a preferred solution, if the bottom wall of the recess does not need to press against the touch member, the thickness of the bottom wall of the recess can be reduced without limitation. The recess with a thinner bottom wall reduces the thickness of the quick-assembly plate.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and persons of ordinary skill in the art may still derive other drawings from these drawings without creative efforts.

REFERENCE NUMERALS 10. quick-assembly component; and
100. quick-assembly plate; 110. first surface; 111. groove; 112. clamping slot; 120. second surface; 130. transition surface; 140. first magnetic member; 200. quick-assembly seat; 210. seat body; 211. base; 2111. sliding groove; 212. top shell; 213. mounting surface; 214. positioning piece; 215. annular groove; 2141. first receding hole; 2142. second receding hole; 220. clamping assembly; 221. clamping member; 222. first restoring member; 223. driving piece; 224. hook; 225. limiting groove; 230. touch assembly; 231. touch member; 232. second restoring member; 233. connecting piece; 240. shock-absorbing ring; and 250. second magnetic member.

DETAILED DESCRIPTION OF THE EMBODIMENTS

The typical implementations embodying the features and advantages of the present disclosure are described in detail below. It should be understood that the present disclosure may have various changes in different implementations, which do not depart from the scope of the present disclosure. The description and drawings herein are essentially used for the purpose of explanation, rather than to limit the present disclosure.

Moreover, the terms such as "first" and "second" are used only for the purpose of description and should not be construed as indicating or implying relative importance or implicitly indicating a quantity of indicated technical features. Therefore, the features defined by "first" and "second" can explicitly or implicitly include one or more features. In the description of the present application, "multiple" means two or more, unless otherwise specifically defined.

It should be noted that, unless otherwise clearly specified, in the description of the present disclosure, the meanings of the terms "mount", "provide", and "connect" should be understood in a broad sense. For example, a connection may be a fixed connection, a removable connection, or an integral connection; may be a mechanical connection or an electrical connection; may be a direct connection or an indirect connection via an intermediate medium; or may be an intercommunication between two components. Those of ordinary skill in the art should understand the specific meanings of the above terms in the present application based on specific situations.

Figure 1:
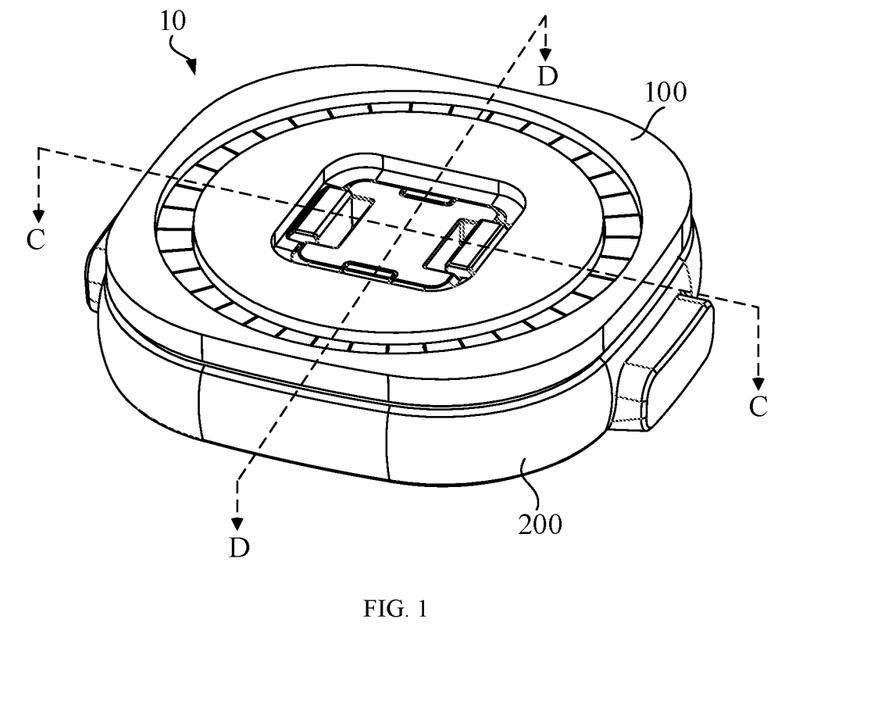
FIG. 1 is a structural view of a quick-assembly component in a clamped state according to an embodiment of the present disclosure.

Referring to FIG. 1, the present disclosure provides a quick-assembly component 10. The quick-assembly component 10 includes a quick-assembly plate 100 and a quick-assembly seat 200. One of the quick-assembly plate 100 and the quick-assembly seat 200 is connected to a photographing device, and the other is connected to a support, such that the photographing device is mounted on the support through the quick-assembly component 10. This is convenient for fixing the photographing position of the photographing device, thereby freeing the hands of the photographer to achieve improved photographing effects. The quick-assembly plate 100 and the quick-assembly seat 200 can be snapped together and separated quickly, such that the photographing device can be quickly assembled and disassembled on the support, which saves time and effort and is convenient to use. It should be noted that the photographing device may be a mobile phone or a camera with a photographing function, and the support may be any frame or pole capable of supporting, for example, the support may be a handlebar of a bicycle. The photographing device can be mounted on the bicycle through the quick-assembly component 10 to facilitate photographing and navigation during riding.

Figure 2:
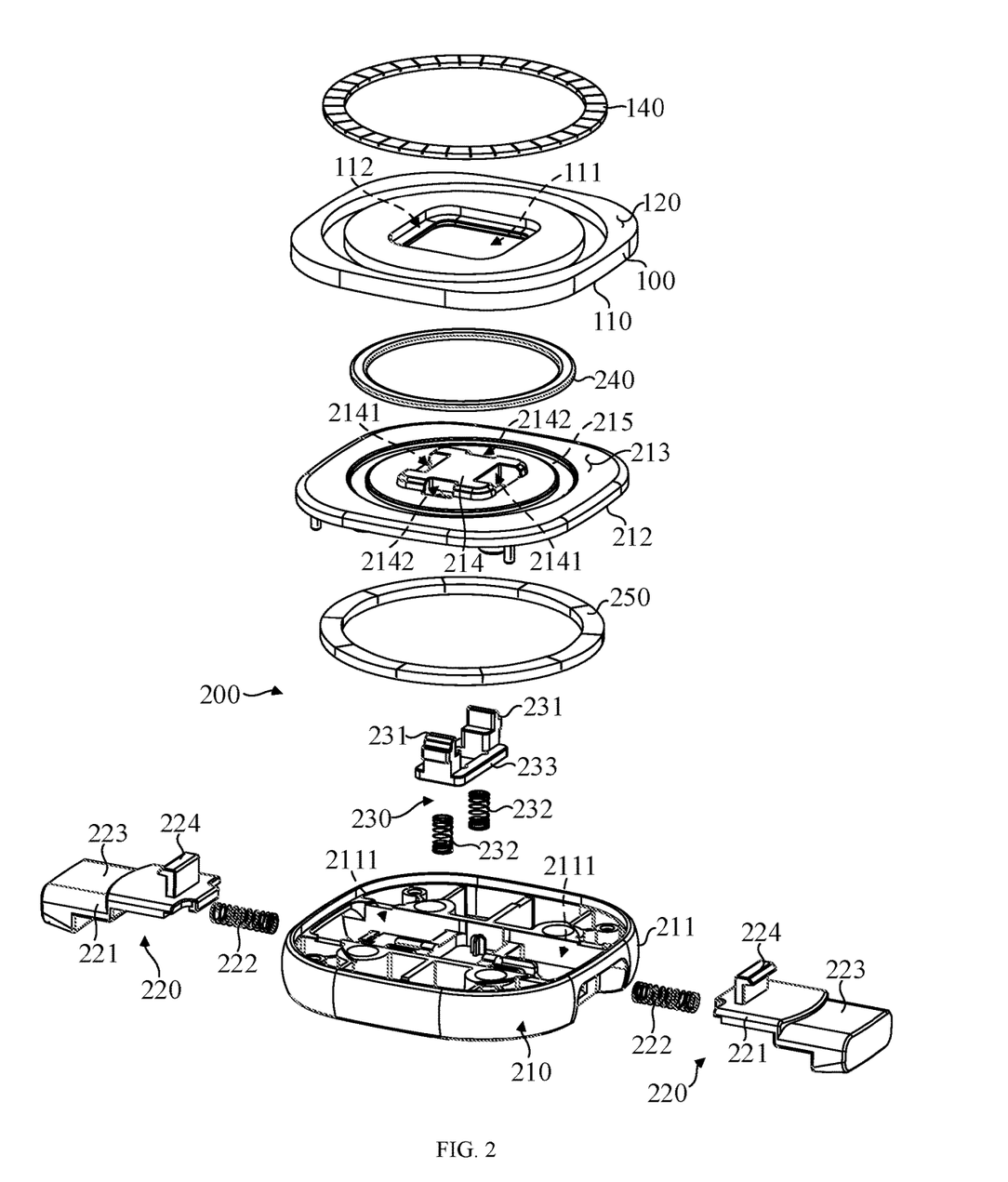
FIG. 2 is an exploded view of the quick-assembly component shown in FIG. 1.
Figure 3:
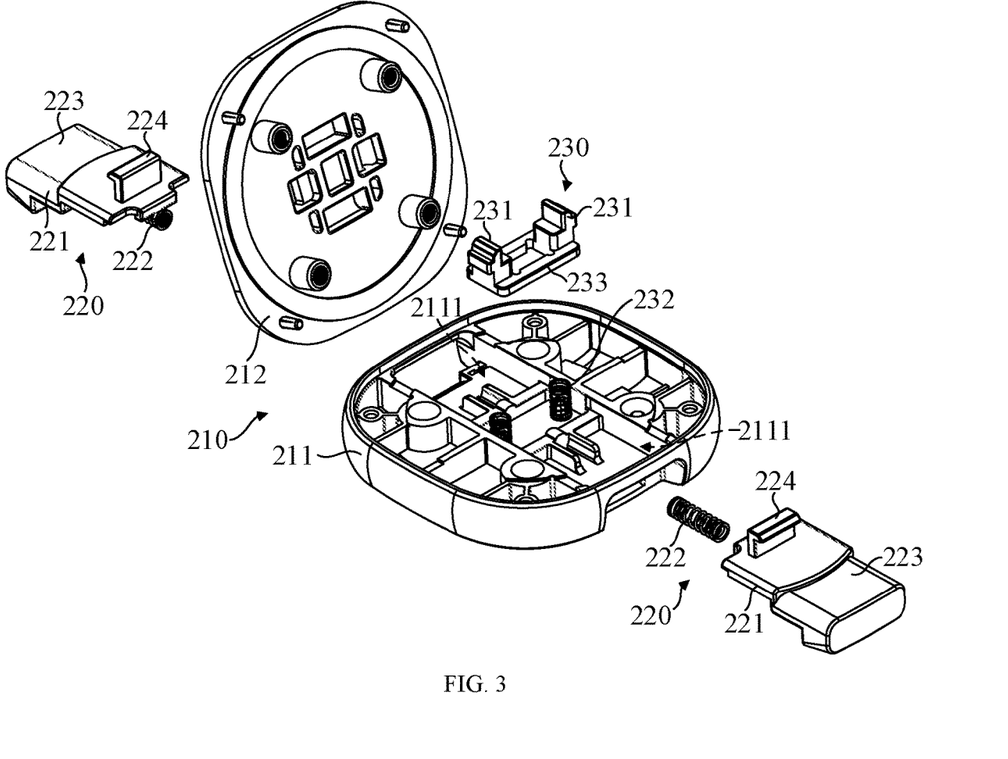
FIG. 3 is an exploded view of a quick-assembly seat of the quick-assembly component shown in FIG. 1.

Referring to FIGS. 2 and 3, the quick-assembly plate 100 has a first surface 110 and a second surface 120 oppositely arranged along a thickness direction thereof. The first surface 110 faces the quick-assembly seat 200, and the first surface 110 is configured for quick-assembly fitting with the quick-assembly seat 200. The second surface 120 is configured to mount the photographing device or the support. In an embodiment, the first surface 110 is provided with a recess 111. The recess 111 may have a rectangular shape as shown in FIG. 2 but should not be limited thereto, and the shape of the recess 111 may be any regular or irregular shape. The recess 111 may penetrate through the first surface 110 and the second surface 120. It is understandable that in other embodiments, the recess 111 may not penetrate through the second surface 120, and the recess 111 may have a bottom wall.

A side wall of the recess 111 is provided with a clamping slot 112 communicating with the recess 111. The clamping slot 112 extends from the inner side of the recess 111 to the outer side. As shown in FIG. 2, the clamping slot 112 surrounds the recess 111 once. It is understandable that, in other embodiments, the clamping slot 112 may also be a non-annular groove. There may be one or more clamping slots 112 provided. When there are multiple clamping slots 112, the multiple clamping slots 112 are arranged around the recess 111.

The quick-assembly seat 200 includes a seat body 210, clamping assemblies 220, and a touch assembly 230. The seat body 210 is understood as a shell of the quick-assembly seat 200. The seat body 210 is configured to mount the touch assembly 220 and the clamping assembly 230. As shown in FIG. 2, the seat body 210 includes a base 211 and a top shell 212. The base 211 and the top shell 212 may be fixedly connected by welding or integral molding or may be detachably connected by clamping or screwing. The seat body 210 has a mounting surface 213. The mounting surface 213 is formed on the top shell 212 of the seat body 210. The mounting surface 213 faces the first surface 110, and the mounting surface 213 is connected to the first surface 110.

The base 211 is provided with a sliding groove 2111. There may be one or more sliding grooves 2111 provided. As shown in FIG. 2, two sliding grooves 2111 extend in the same direction. The extending direction of the sliding grooves 2111 is perpendicular to the thickness direction of the quick-assembly seat 200 and the quick-assembly plate 100. It is understandable that, in other embodiments, there may also be one or more sliding grooves 2111, which is not limited herein.

The mounting surface 213 of the top shell 212 is provided with a protruded positioning piece 214. When the mounting surface 213 and the first surface 110 are brought close to each other, the positioning piece 214 is matched with the recess 111, and is accommodated in the recess 111. When the positioning piece 214 is accommodated in the recess 111, the quick-assembly plate 100 is instantly clamped with the quick-assembly seat 200. That is, when the positioning piece 214 is accommodated in the recess 111, the clamping assembly 220 is instantly clamped in the clamping slot 112. It is understandable that, in other embodiments, if positioning is not required, the positioning piece 214 may not be provided.

The positioning piece 214 is provided with first receding holes 2141 and second receding holes 2142 which communicate with an inside of the seat body 210. A holing direction of the first receding holes 2141 and the second receding holes 2142 is parallel to the thickness direction of the quick-assembly plate 100 and the quick-assembly seat 200. As shown in FIG. 2, there are two first receding holes 2141 and two second receding holes 2142 provided. The two first receding holes 2141 are oppositely arranged, and the two second receding holes 2142 are also oppositely arranged. It is understandable that, in other embodiments, the quantity of the first receding hole 2141 and the second receding hole 2142 may also be one or three or more.

The clamping assembly 220 includes a clamping member 221 and a first restoring member 222 provided between the clamping member 221 and the seat body 210. The clamping member 221 is movable relative to the seat body 210, such that the first restoring member 222 accumulates and releases a restoring force. In an embodiment, the clamping member 221 is slidably provided in the sliding groove 2111, and a direction in which the clamping member 221 moves relative to the seat body 210 is perpendicular to the thickness direction of the quick-assembly plate 100. As shown in FIG. 2, there are two clamping assemblies 220 provided. The quantity of the clamping assemblies 220 is equal to that of the sliding grooves 2111.

It should be noted that, as shown in FIG. 2, the first restoring member 222 is a spring, and the restoring force accumulated and released by the first restoring member 222 is an elastic force. Understandably, the first restoring member 222 may also be an elastic member, such as a rubber pad, a silicone pad, or an elastic sheet, other than a spring. Of course, the first restoring member 222 may also be a magnetic member, and the restoring force accumulated and released by the first restoring member 222 is a magnetic force. When the first restoring member 222 is a magnetic member, the first restoring member 222 may include two magnets. The two magnets are provided on the clamping member 221 and the seat body 210 respectively to generate a magnetic attraction or repulsion force.

The clamping member 221 includes a driving piece 223 and a hook 224 which are connected to each other. The first restoring member 222 is provided between the driving piece 223 and the seat body 210. The hook 224 can be exposed out of the seat body 210 to extend into the recess 111. Therefore, the hook 224 exposed out of the seat body 210 can be clamped with the clamping slot 112 to realize quick-assembly fixation. In this embodiment, the hook 224 is inserted into the first receding hole 2141 and is movable relative to the seat body 210 along a direction perpendicular to the thickness direction of the quick-assembly plate 100. Thus, the hook 224 can be driven into the clamping slot 112 by the driving piece 223.

Taking the first restoring member 222 as a spring as an example, when the driving piece 223 drives the hook 224 to move toward the inner side of the seat body 210, the driving piece 223 presses the spring such that the spring is compressed to accumulate an elastic force. At this time, the hook 224 moving toward the inner side extends into the recess 111 and is opposite to the recess 112. When the spring releases the accumulated elastic force, the spring drives the hook 224 into the clamping slot 112 with a tendency to return to its original state.

The touch assembly 230 includes a touch member 231 and second restoring member(s) 232. The second restoring member 232 is provided between the touch member 231 and the seat body 210. The touch member 231 is movable relative to the seat body 210 along the thickness direction of the quick-assembly plate 100. During the movement of the touch member 231 relative to the seat body 210, the touch member 231 causes the second restoring member 232 to accumulate and release a restoring force. Specifically, the touch member 231 is inserted into the second receding hole 2142 and is movably provided in the second receding hole 2142. As shown in FIG. 2, there are two touch assemblies 230 provided. The quantity of the touch assemblies 230 is equal to that of the second receding holes 2142. It should be understood that, when the quantity of the touch assemblies 230 is two or more, one second restoring member 232 may be set to replace the second restoring members 232 of all the touch assemblies 230 to reduce the quantity of the second restoring members 232, thereby reducing consumables. This requires the touch members 231 in each touch assembly 230 to be able to move synchronously. For example, as shown in FIG. 2, a connecting piece 233 is provided between the two touch members 231, such that the two touch members 231 move synchronously. It is defined that the two touch members 231 shown in FIG. 2 are opposite to each other along a first direction and the two clamping members 221 shown in FIG. 2 are opposite to each other along a second direction. The first direction and the second direction are perpendicular to the thickness direction of the quick-assembly plate 100. The two clamping members 221 opposite to each other along the second direction can move toward the touch members 231 to be separated from the clamping slot 112, and the second restoring member 232 can release the restoring force to drive the two touch members 231 opposite to each other along the first direction to be clamped with the clamping members 221.

It should be noted that, as shown in FIG. 2, the second restoring member 232 is a spring, and the restoring force accumulated and released by the second restoring member 232 is an elastic force. Understandably, the second restoring member 232 may also be an elastic member, such as a rubber pad, a silicone pad, or an elastic sheet, other than a spring. Of course, the second restoring member 232 may also be a magnetic member, and the restoring force accumulated and released by the second restoring member 232 is a magnetic force. When the second restoring member 232 is a magnetic member, the second restoring member 232 may include two magnets, which are provided on the touch member 231 and the seat body 210 respectively to generate a magnetic attraction or repulsion force.

Figure 4:
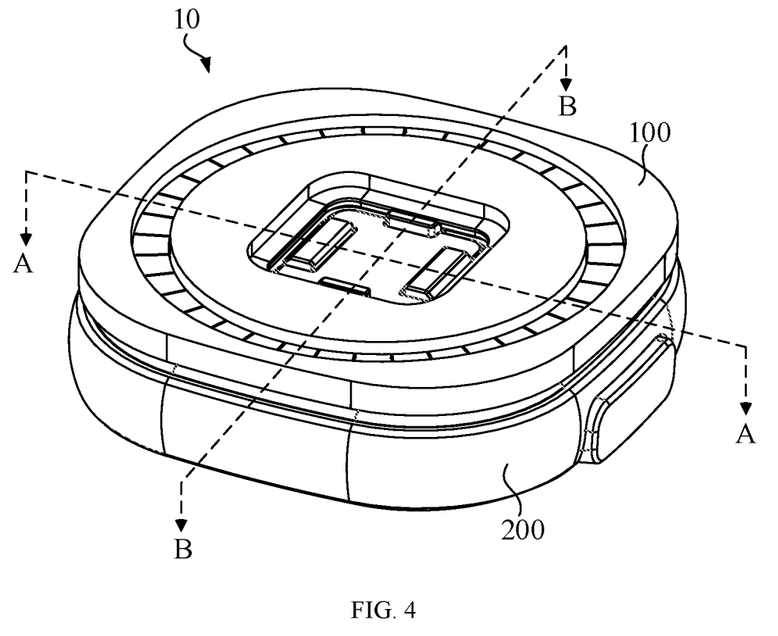
FIG. 4 is a structural view of the quick-assembly component in a separated state according to an embodiment of the present disclosure.
Figure 5:
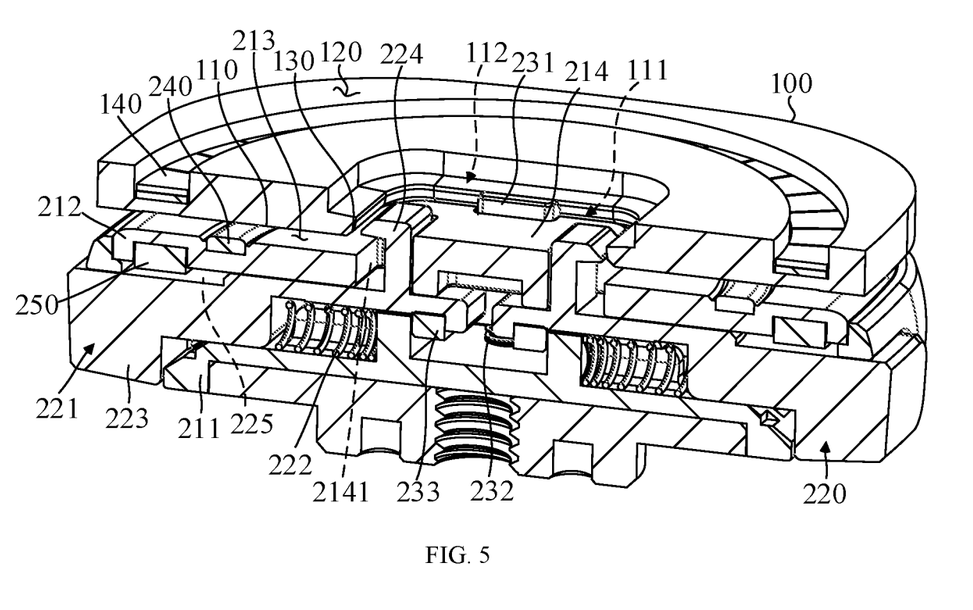
FIG. 5 is a sectional view taken along the line A-A shown in FIG. 4.
Figure 6:
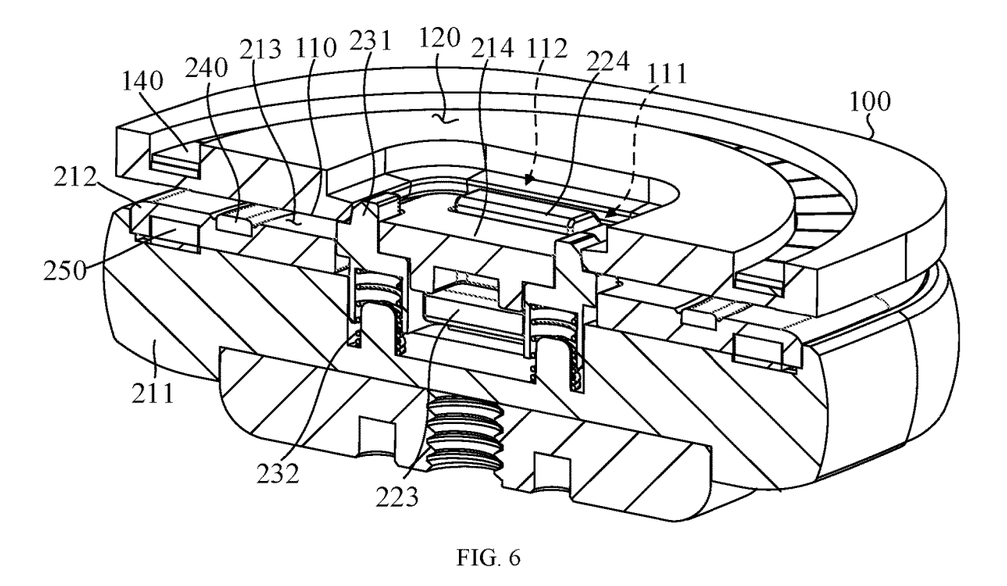
FIG. 6 is a sectional view taken along the line B-B shown in FIG. 4.
Figure 7:
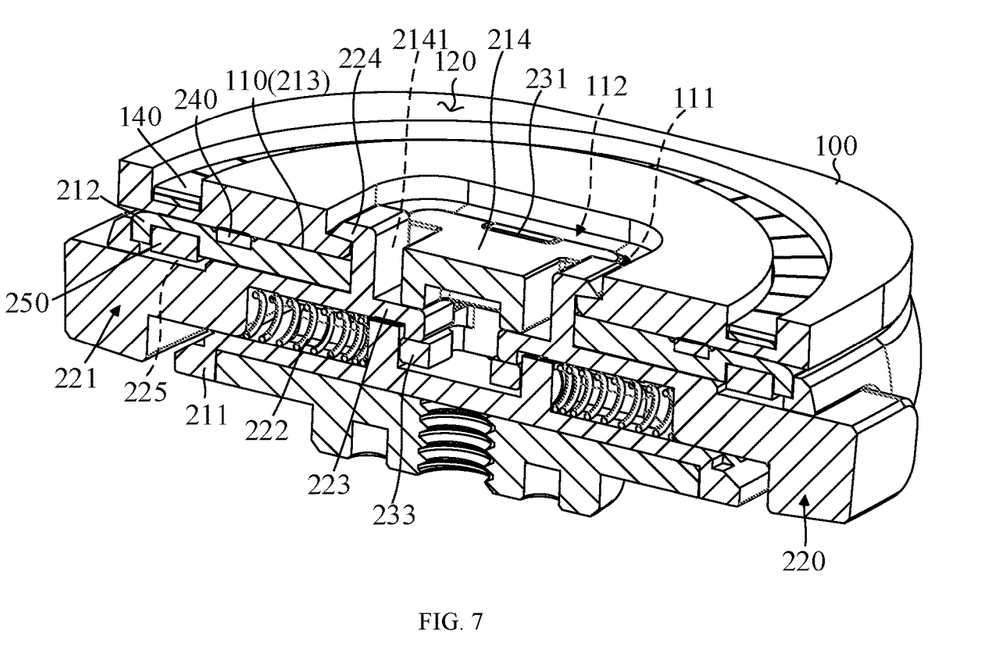
FIG. 7 is a sectional view taken along the line C-C shown in FIG. 1.
Figure 8:
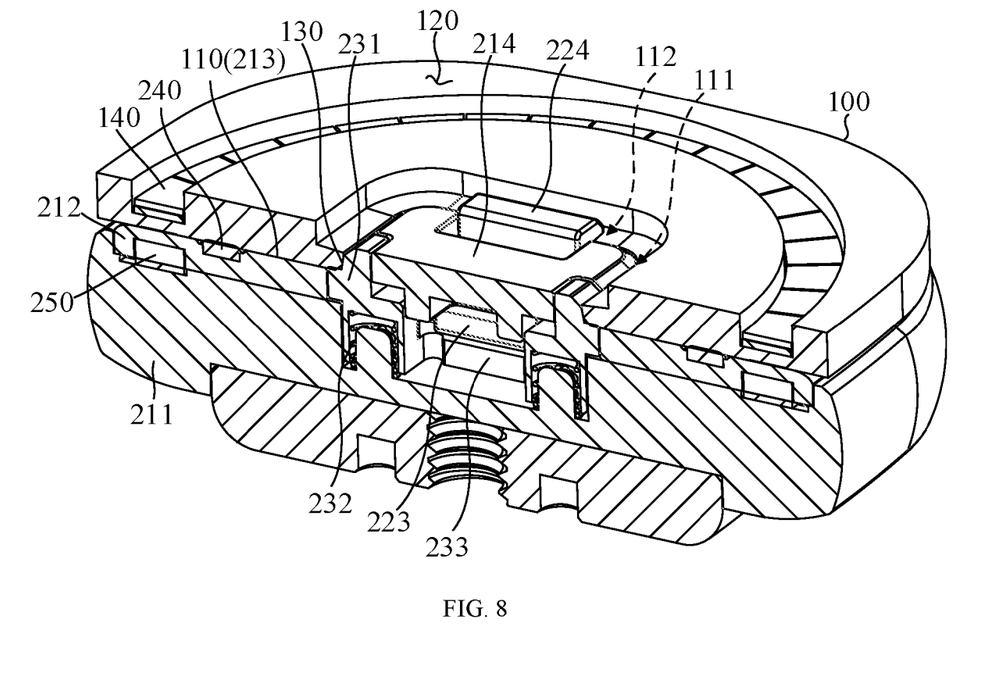
FIG. 8 is a sectional view taken along the line D-D shown in FIG. 1.

In the quick-assembly component 10 of the present disclosure, referring to FIGS. 4 and 5, the clamping member 221 can be clamped with the touch member 231 to allow the first restoring member 222 to accumulate a restoring force. As shown in the figure, the clamping member 221 is clamped with the connecting piece 233 that is connected to and integrally formed with the touch member 231. That is, the driving piece 223 is clamped with the connecting piece 233, and the first restoring member 222 accumulates a restoring force. The hook 224 is located at the inner side of the first receding hole 2141 and is within the space of the first receding hole. The positioning piece 214 and the hook 224 are positioned in the recess 111. Referring to FIG. 6, to mount the quick-assembly plate 100 and the quick-assembly seat 200, the quick-assembly plate 100 and the quick-assembly seat 200 are brought close to each other, such that the touch member 231 presses against the first surface 110 and moves relative to the seat body 210 along the thickness direction of the quick-assembly plate 100. Referring to FIGS. 7 and 8, the touch member 231 presses the second restoring member 232 until the touch member 231 and driving piece 223 are misaligned with each other. As shown in the figure, the driving piece 223 and the connecting piece 233 are misaligned with each other, and after the misalignment, the driving piece 223 is separated from the connecting piece 223 and the touch member 231. The restoring force accumulated by the first restoring member 222 is released to drive the hook 224 into the clamping slot 112. That is, the first restoring member 222 drives the hook 224 to move in the first receding hole 2131 toward the outer side of the seat body 210.

The above described is the clamping process of the quick-assembly plate 100 and the quick-assembly seat 200. When it is necessary to separate the quick-assembly plate 100 from the quick-assembly seat 200, referring to FIGS. 7 and 8, the driving piece 223 is pressed laterally to move the driving piece 223 toward an inner side of the seat body 210. The driving piece 223 presses the first restoring member 222 and causes the first restoring member 222 to accumulate a restoring force again. Referring to FIGS. 5 and 6, when the driving piece 223 moves laterally to be misaligned with the touch member 231, the touch member 231 moves along the thickness direction of the quick-assembly plate 100 under the action of the restoring force released by the second restoring member 232. The touch member 231 is clamped with the driving piece 223, and the hook 224 moves laterally along the space of the first receding hole 2141 to be separated from the clamping slot 112. The hook 224 is maintained at the inner side of the first receding hole 2141. At this time, the hook 224 and the positioning piece 214 can be separated from the recess 111, that is, the quick-assembly seat 200 can be directly separated from the quick-assembly plate 100.

It should be noted that the second restoring member 232 is not necessary for the solution of the present disclosure, that is, the touch assembly 230 may not include the second restoring member 232. In this case, the touch member 231 can be driven to move along the thickness direction of the quick-assembly plate 100 manually or through a driving structure. For example, during the clamping process of the quick-assembly plate 100 and the quick-assembly seat 200, the clamping relationship between the touch member 231 and the clamping member 221 can be maintained, and the touch member 231 can be pressed against the first surface 110, such that the touch member 231 and the clamping member 221 are misaligned with each other. In this way, the first restoring member 222 releases the restoring force to drive the hook 224 into the clamping slot 112. During the separation process of the quick-assembly plate 100 and the quick-assembly seat 200, since the second restoring member 232 is not provided, after the driving piece 223 and the touch member 231 are misaligned, the touch member 231 may not be automatically clamped with the driving piece 223 to maintain the hook 224 located at the inner side of the first receding hole 2141. Therefore, it is necessary to manually press the driving piece 223 to separate the hook 224 and the positioning piece 214 from the recess 111. Nevertheless, in terms of the experience of engaging the quick-assembly plate 100 with the quick-assembly seat 200, the advantage of pressing to clamp remains unchanged.

In the quick-assembly component 10 and the photographing apparatus of the embodiments of the present disclosure, one of the quick-assembly plate 100 and the quick-assembly seat 200 is connected to the photographing device, and the other is connected to the support. In this way, the photographing device is fixedly mounted on the support through the fitting between the quick-assembly plate 100 and the quick-assembly seat 200. Specifically, the quick-assembly plate 100 and the quick-assembly seat 200 are brought close to each other. The touch member 231 presses against the first surface 110 and moves relative to the seat body 210 along the thickness direction of the quick-assembly plate 100, such that the clamping member 221 is separated from the touch member 231. After being separated from the touch member 231, the clamping member 221 enters the clamping slot 112 under the restoring force released by the first restoring member 222 to realize the quick-assembly fitting of the quick-assembly plate 100 and the quick-assembly seat 200. Based on the configuration of the touch member 231, the quick-assembly fitting of the quick-assembly plate 100 and the quick-assembly seat 200 can be realized by simply bringing the quick-assembly plate 100 and the quick-assembly seat 200 close to each other and pressing the touch member 231, which simplifies the quick-assembly operation steps. In addition, since the touch member 231 presses against the first surface 110 instead of protruding into the recess 111 and pressing against the bottom wall of the recess 111, the bottom wall of the recess of the quick-assembly plate 100 can be omitted. That is, the recess 111 can penetrate through the first surface 110 and the second surface 120, and the recess 111 without the bottom wall can make the quick-assembly plate 100 thinner and reduce the thickness of the quick-assembly plate 100. Alternatively, the bottom wall of the recess 111 may be thinner. In the conventional solution, the bottom wall of the recess 111 presses against the touch member 231, and the bottom wall of the recess 111 must have a certain thickness to avoid being punctured. In a preferred solution, if the bottom wall of the recess 111 does not need to press against the touch member 231, the thickness of the bottom wall of the recess 111 can be reduced without limitation. The recess 111 with a thinner bottom wall reduces the thickness of the quick-assembly plate 100, thereby reducing the size of the quick-assembly component 10.

In an embodiment, a side of the recess 111 includes a transition surface 130 inclined outwardly relative to the first surface 110. The transition surface 130 is a curved surface or an inclined surface. Before the quick-assembly plate 100 is fitted with the quick-assembly seat 200, the clamping member 221 is separated from the touch member 231. When the touch member 231 presses against the first surface 110 and moves relative to the seat body 210 along the thickness direction of the quick-assembly plate 100, the clamping member 221 enters the recess 111 along the transition surface 130 and is opposite to the clamping slot 112. When the clamping member 221 and the clamping slot 112 are opposite to each other, the clamping member 221 enters the clamping slot 112 under the restoring action of the first restoring member 222. Based on the configuration of the transition surface 130, the quick-assembly plate 100 and the quick-assembly seat 200 have two quick-assembly fitting modes, that is, they can be assembled quickly regardless of whether the hook 224 is located at the inner side or the outer side of the first receding hole 2141.

In an embodiment, a shock-absorbing ring 240 is provided on a side of the seat body 210 facing the quick-assembly plate 100. The shock-absorbing ring 240 surrounds the positioning piece 214 and protrudes from the seat body 210. The shock-absorbing ring 240 is in contact with the first surface 110 when the quick-assembly plate 100 is fitted with the quick-assembly seat 200. The shock-absorbing ring 240 avoids collision and wear between the first surface 110 and the mounting surface 213 during the quick-assembly fitting of the quick-assembly plate 100 and the quick-assembly seat 200. In an embodiment, the side of the seat body 210 facing the quick-assembly plate 100 is provided with an annular groove 215, that is, the top shell 212 is provided with the annular groove 215. The shock-absorbing ring 240 is partially accommodated in the annular groove 215 for easy mounting. It should be noted that the shock-absorbing ring 240 may be, but is not limited to, an elastic structure such as a silicone ring or a rubber ring.

In an embodiment, the quick-assembly plate 100 is provided with a first magnetic member 140, and the seat body 210 is provided with a second magnetic member 250. When the quick-assembly plate 100 and the quick-assembly seat 200 are brought close to each other, the first magnetic member 140 and the second magnetic member 250 are magnetically attracted such that the hook 224 is positioned in the recess 111. If the magnetic attraction between the first magnetic member 140 and the second magnetic member 250 is large enough, when the quick-assembly plate 100 and the quick-assembly seat 200 are brought close to each other, the first magnetic member 140 and the second magnetic member 250 are magnetically attracted to drive the touch member 231 to press against the first surface 110 and press the second restoring member 232. In this way, the hook 224 can be instantly driven into the clamping slot 112.

In an embodiment, the clamping member 221 is provided with a limiting groove 225. Specifically, the driving piece 223 is provided with the limiting groove 225. The second magnetic member 250 is fixed to the top shell 212. The second magnetic member 250 protrudes from the top shell 212 and is partially provided in the limiting groove 225 to limit the movement of the clamping member 221. In this way, the clamping member 221 is prevented from sliding excessively and separated from the seat body 210, thereby preventing the clamping member 221 from accidentally sliding out of the seat body 210.

The present disclosure is described above with reference to several typical implementations. It should be understood that the terms used herein are intended for illustration, rather than limiting. The present disclosure may be specifically implemented in many forms without departing from the spirit or essence of the present disclosure. Therefore, it should be understood that the above embodiments are not limited to any of the above-mentioned details but should be broadly interpreted according to the spirit and scope defined by the appended claims. Therefore, any changes and modifications falling within the claims or the equivalent scope thereof should be covered by the appended claims.

What is claimed is:

1. A quick-assembly component comprising:
   a quick-assembly plate comprising a first surface and a second surface, wherein the first surface and the second surface are oppositely arranged along a thickness direction of the quick-assembly plate; the first surface is provided with a recess; and a side wall of the recess is provided with a clamping slot communicating with the recess; and
   a quick-assembly seat comprising a seat body, a touch assembly, and clamping assemblies, wherein the touch assembly comprises a touch member; the touch member is movable relative to the seat body along the thickness direction of the quick-assembly plate; the clamping assemblies each comprise a clamping member and a first restoring member provided between the clamping member and the seat body; and the clamping member is movable relative to the seat body to allow the first restoring member to accumulate and release a restoring force;
   wherein, when the clamping member is clamped with the touch member to allow the first restoring member to accumulate the restoring force; when the quick-assembly plate and the quick-assembly seat are brought close to each other, the touch member presses against the first surface, and moves relative to the seat body along the thickness direction of the quick-assembly plate, the clamping member is separated from the touch member, and the first restoring member releases the restoring force to drive the clamping member into the clamping slot,
   wherein the clamping member moves relative to the seat body along a direction perpendicular to the thickness direction of the quick-assembly plate; the clamping member comprises a driving piece and a hook; the driving piece and the hook are connected to each other; the first restoring member is provided between the driving piece and the seat body; the hook enters the recess when the touch member presses against the first surface; and when the driving piece is separated from the touch member, the hook enters the clamping slot under a restoring action of the first restoring member,
   wherein an outer surface of the seat body is provided with a protruded positioning piece, and the protruded positioning piece is matched with and accommodated in the recess, and
   wherein the protruded positioning piece is provided with first receding holes and second receding holes; the first receding holes and the second receding holes communicate with an inside of the seat body; the hook is inserted into the first receding hole, and is movable relative to the seat body along the direction perpendicular to the thickness direction of the quick-assembly plate; and the touch member is inserted into the second receding hole, and is movable relative to the seat body along the thickness direction of the quick-assembly plate.

2. The quick-assembly component according to claim 1, wherein a shock-absorbing ring is provided on a side of the seat body facing the quick-assembly plate; the shock-absorbing ring surrounds the protruded positioning piece, and protrudes from the seat body; and the shock-absorbing ring is in contact with the first surface when the quick-assembly plate is fitted with the quick-assembly seat.

3. The quick-assembly component according to claim 2, wherein an annular groove is provided at the side of the seat body facing the quick-assembly plate; and the shock-absorbing ring is partially accommodated in the annular groove.

4. The quick-assembly component according to claim 1, wherein the first restoring member is an elastic member, and the restoring force accumulated and released by the first restoring member is an elastic force.

5. The quick-assembly component according to claim 1, wherein the first restoring member is a magnetic member, and the restoring force accumulated and released by the first restoring member is a magnetic force.

6. The quick-assembly component according to claim 1, wherein the touch assembly further comprises a second restoring member; the second restoring member is provided between the touch member and the seat body; and the touch member is movable relative to the seat body to allow the second restoring member to accumulate and release a restoring force; and
when the clamping member is separated from the clamping slot, the first restoring member accumulates the restoring force; and the touch member is clamped with the clamping member under the action of the restoring force accumulated by the second restoring member.

7. The quick-assembly component according to claim 6, wherein the second restoring member is an elastic member, and the restoring force accumulated and released by the second restoring member is an elastic force.

8. The quick-assembly component according to claim 6, wherein the second restoring member is a magnetic member, and the restoring force accumulated and released by the second restoring member is a magnetic force.

9. The quick-assembly component according to claim 1, wherein a side of the recess comprises a transition surface inclined outwardly relative to the first surface; the transition surface is a curved surface or an inclined surface; and before the quick-assembly plate is fitted with the quick-assembly seat, the clamping member is separated from the touch member; and
when the touch member presses against the first surface and moves relative to the seat body along the thickness direction of the quick-assembly plate, the clamping member enters the recess along the transition surface and is opposite to the clamping slot; and the clamping member enters the clamping slot under a restoring action of the first restoring member.

10. The quick-assembly component according to claim 1, wherein the quick-assembly plate is provided with a first magnetic member, and the seat body is provided with a second magnetic member; and when the quick-assembly plate and the quick-assembly seat are brought close to each other, the first magnetic member and the second magnetic member are magnetically attracted to position the clamping member in the recess.

11. The quick-assembly component according to claim 10, wherein when the quick-assembly plate and the quick-assembly seat are brought close to each other, the first magnetic member and the second magnetic member are magnetically attracted to allow the touch member to press against the first surface and move on the first surface, and to instantly drive the clamping member into the clamping slot.

12. The quick-assembly component according to claim 1, wherein the recess penetrates through the first surface and the second surface.

13. A quick-assembly component comprising:
a quick-assembly plate comprising a first surface and a second surface, wherein the first surface and the second surface are oppositely arranged along a thickness direction of the quick-assembly plate; the first surface is provided with a recess; and a side wall of the recess is provided with a clamping slot communicating with the recess; and
a quick-assembly seat comprising a seat body, a touch assembly, and clamping assemblies, wherein the touch assembly comprises a touch member; the touch member is movable relative to the seat body along the thickness direction of the quick-assembly plate; the clamping assemblies each comprise a clamping member and a first restoring member provided between the clamping member and the seat body; and the clamping member is movable relative to the seat body to allow the first restoring member to accumulate and release a restoring force,
wherein, when the clamping member is clamped with the touch member to allow the first restoring member to accumulate the restoring force; when the quick-assembly plate and the quick-assembly seat are brought close to each other, the touch member presses against the first surface, and moves relative to the seat body along the thickness direction of the quick-assembly plate, the clamping member is separated from the touch member, and the first restoring member releases the restoring force to drive the clamping member into the clamping slot,
wherein the touch assembly further comprises a second restoring member; the second restoring member is provided between the touch member and the seat body; and the touch member is movable relative to the seat body to allow the second restoring member to accumulate and release a restoring force,
when the clamping member is separated from the clamping slot, the first restoring member accumulates the restoring force; and the touch member is clamped with the clamping member under the action of the restoring force accumulated by the second restoring member, and
wherein the touch assembly comprises at least two touch members oppositely arranged along a first direction, and the clamping assembly comprises at least two clamping members oppositely arranged along a second direction; the first direction, the second direction and the thickness direction of the quick-assembly plate are perpendicular to each other; and the at least two clamping members oppositely arranged along the second direction are movable toward the at least two touch members to be separated from the clamping slot, to allow the second restoring member to release the restoring force to drive the at least two touch members oppositely arranged along the first direction to be clamped with the clamping members.

14. The quick-assembly component according to claim 13, wherein a number of the first restoring members is equal to a number of the clamping members, and a number of the second restoring members is equal to a number of the touch members.

15. The quick-assembly component according to claim 13, wherein a connecting piece is provided between the at least two touch members arranged along the first direction to allow the at least two touch members to move synchronously.

16. A quick-assembly component comprising:
a quick-assembly plate comprising a first surface and a second surface, wherein the first surface and the second surface are oppositely arranged along a thickness direction of the quick-assembly plate; the first surface is provided with a recess; and a side wall of the recess is provided with a clamping slot communicating with the recess; and a quick-assembly seat comprising a seat body, a touch assembly, and clamping assemblies, wherein the touch assembly comprises a touch member; the touch member is movable relative to the seat body along the thickness direction of the quick-assembly plate; the clamping assemblies each comprise a clamping member and a first restoring member provided between the clamping member and the seat body; and the clamping member is movable relative to the seat body to allow the first restoring member to accumulate and release a restoring force, wherein, when the clamping member is clamped with the touch member to allow the first restoring member to accumulate the restoring force; when the quick-assembly plate and the quick-assembly seat are brought close to each other, the touch member presses against the first surface, and moves relative to the seat body along the thickness direction of the quick-assembly plate, the clamping member is separated from the touch member, and the first restoring member releases the restoring force to drive the clamping member into the clamping slot, wherein the quick-assembly plate is provided with a first magnetic member, and the seat body is provided with a second magnetic member; and when the quick-assembly plate and the quick-assembly seat are brought close to each other, the first magnetic member and the second magnetic member are magnetically attracted to position the clamping member in the recess, and wherein the clamping member is provided with a limiting groove; and the second magnetic member is provided in the limiting groove to limit movement of the clamping member.

17. A photographing apparatus comprising a photographing device and the quick-assembly component according to claim 1, wherein the photographing device is connected to the quick-assembly plate or the quick-assembly seat.

* * * * *